(12) United States Patent
Qi

(10) Patent No.: US 7,085,867 B2
(45) Date of Patent: Aug. 1, 2006

(54) METHODS AND STRUCTURE FOR SCSI2 TO SCSI3 RESERVATION PROTOCOL MAPPING

(75) Inventor: Yanling Qi, Austin, TX (US)

(73) Assignee: LSI Logic Corporation, Milpitas, CA (US)

( * ) Notice: Subject to any disclaimer, the term of this patent is extended or adjusted under 35 U.S.C. 154(b) by 250 days.

(21) Appl. No.: 10/635,887

(22) Filed: Aug. 6, 2003

(65) Prior Publication Data

US 2005/0033888 A1    Feb. 10, 2005

(51) Int. Cl.
  G06F 13/12    (2006.01)
  G06F 12/14    (2006.01)
  G06F 13/00    (2006.01)
  G06F 15/16    (2006.01)

(52) U.S. Cl. .................. 710/200; 710/74; 709/210

(58) Field of Classification Search ............... 710/200, 710/74; 709/210–211
See application file for complete search history.

(56) References Cited

U.S. PATENT DOCUMENTS

| | | | |
|---|---|---|---|
| 5,748,611 A * | 5/1998 | Allen et al. ................. 370/221 |
| 6,209,023 B1 * | 3/2001 | Dimitroff et al. ........... 709/211 |
| 6,286,056 B1 * | 9/2001 | Edgar et al. .................... 710/5 |
| 6,622,163 B1 * | 9/2003 | Tawill et al. ................ 709/211 |
| 6,654,902 B1 * | 11/2003 | Brunelle et al. ............... 714/4 |
| 6,658,587 B1 * | 12/2003 | Pramanick et al. ............. 714/5 |
| 6,954,881 B1 * | 10/2005 | Flynn Jr. et al. .............. 714/43 |
| 2002/0141618 A1 * | 10/2002 | Ciolli et al. ................. 382/104 |
| 2003/0120743 A1 * | 6/2003 | Coatney et al. ............. 709/217 |
| 2003/0188108 A1 * | 10/2003 | Damron et al. ............. 711/147 |
| 2004/0153711 A1 * | 8/2004 | Brunelle et al. ............... 714/4 |

FOREIGN PATENT DOCUMENTS

| | | |
|---|---|---|
| EP | 1117042 A2 * | 7/2001 |
| EP | 1246060 A1 * | 10/2002 |
| EP | 1321848 A2 * | 6/2003 |

OTHER PUBLICATIONS

Cummings, Roger; "Further Work on Migration to Persistent Reservations"; T10 Committee; Nov. 6, 2002; T11/02-483r0; available online at <http://www.t10.org>.*
Snively, Bob; "Command behavior under reservations"; T10 Committee; Jul. 24, 1998; T10/98-164 revision 1; available online at <http://www.t10.org>.*
American National Standard of Accredited Standards Committee; "SCSI-3 Primary Commands"; American National Standards Institute; Draft Revision 11a; Mar. 28, 1997; available online at http://www.t10.org/ftp/t10/drafts/spc/spc-r11a.pdf.*

(Continued)

Primary Examiner—Paul R. Myers
Assistant Examiner—Ryan Stiglic
(74) Attorney, Agent, or Firm—Duft Bornsen & Fishman, LLP

(57) ABSTRACT

Methods and associated structures for transparently mapping SCSI2 reservation protocol exchanges into corresponding SCSI3 reservation protocol exchanges. A mapping element may be operable within host systems that support SCSI2 reservation protocols. The mapping element intercepts and translates SCSI2 reservation exchanges into corresponding SCSI3 reservation protocol exchanges. The mapped exchanges may then be forwarded to a SCSI3 based storage subsystem to permit such an updated storage subsystem to appropriately interact with a cluster of host systems. The cluster of host systems may then be comprised of a heterogeneous mix of SCSI2 and SCSI3 based host applications.

19 Claims, 7 Drawing Sheets

OTHER PUBLICATIONS

American National Standard of Accredited Standards Committee; "SCSI Primary Commands—3 (SPC-3)"; American National Standards Institute; Draft Revision 13; May 16, 2003 ;available online at http://www.t10.org/ftp/t10/drafts/spc3/spc3r13.pdf.*

* cited by examiner

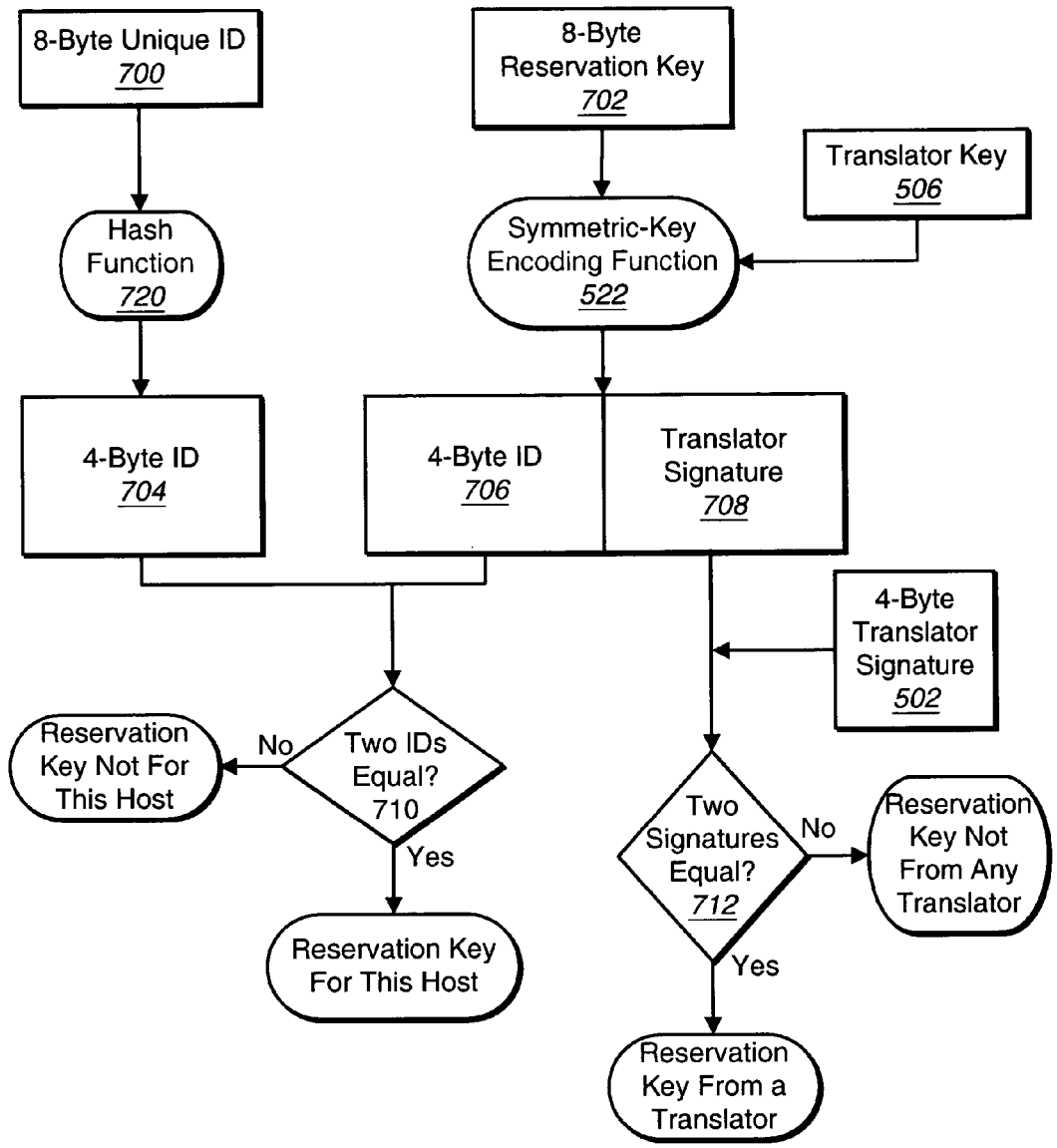
FIG._7

METHODS AND STRUCTURE FOR SCSI2 TO SCSI3 RESERVATION PROTOCOL MAPPING

BACKGROUND OF THE INVENTION

1. Field of the Invention

The invention relates to storage management and more specifically relates to protocols associated with reservation of portions of a storage subsystem multi-initiator or clustered host environment.

2. Discussion of Related Art

Numerous computing applications utilize high performance and high reliability storage subsystems. Such subsystems are used for storing significant volumes of user and system data. Such storage may require high performance where processing transaction rates or raw data transfer rates required for particular applications are substantial. High reliability is often required in mission critical computing applications where loss of data or even temporary unavailability of stored data is unacceptable for the particular application.

Often such high performance and high reliability storage systems utilize SCSI command structures. SCSI commands are standardized in accordance with specifications widely accepted in the industry. Numerous broad revisions of the SCSI command standard specifications have evolved over the years. In particular, SCSI2 has evolved as a widely accepted standard but has given way to equally broad acceptance of SCSI3 standards in recent years.

One particular feature provided in the SCSI2 standards relate to so-called reservation protocols. Reservation protocols generally allow for and an attached host system to request exclusive access to portions of a SCSI2 storage subsystem. The portion to be reserved may comprise the entirety of a volume or logical unit within the storage subsystem or may comprise smaller extents or portions of a volume or logical unit. In general, a host system (often referred to as an initiator) transmits a reservation request to the storage subsystem (often referred to as a target). In response to receipt of such a reservation request, the storage subsystem reserves the requested portion of the storage subsystem for exclusive accessed by the requesting initiator. When the requested and granted exclusive access is no longer required by the host system, it transmits a release request to the storage subsystem to release its temporary exclusive access to the previously reserved portion of the subsystem.

A problem arises in use of the SCSI2 reservation protocols in that if an initiator (i.e., a host system) abnormally ends operation having a portion of the storage system reserved, the reserved portion may be inaccessible to other host systems coupled to the storage subsystem. A partial solution to this problem as presently practiced in the art involves performing a reset of the storage subsystem to release all previously reserved portions of the storage subsystem. Each host system coupled to the reset storage subsystem must then reestablish any required a reservations for its ongoing exclusive access to the storage subsystem.

SCSI3 command standard specifications provide a different architecture for reservation protocols. Under the SCSI3 command standard specifications, a persistent reservation may be established by a request from a host the system directed to the storage subsystem (i.e., a persistent reservation out command). Any host system coupled to the SCSI3 storage subsystem may also inquire of the storage subsystem as to presently established persistent reservations. A persistent reservation in SCSI3 command returns information from the storage subsystem to the requesting host system to thereby discover all presently active reservations. Unique identifiers are associated with each such presently active reservation. A so called "third party" release parameter is available in the persistent reservation out SCSI3 command to allow any initiator (any host) to force the release of a previously requested persistent reservation on behalf of an abnormally terminated host system application.

Further details of both SCSI2 and SCSI3 reservation protocols are generally known in the art and maybe viewed in public specification standards such as available on the Web at www.t10.org. In particular, SCSI3 persistent reservation commands and exchange protocols are discussed in: SPC-3 SCSI Primary Commands-3 (third generation command set for all SCSI devices), which is hereby incorporated by reference. The older SCSI2 reservation protocols are now obsoleted by the updated SCSI3 persistent reservation protocols. However, since older legacy systems still generate such sequences, the specifications therefor are still available such as in SPC SCSI-3 Primary Commands (first generation command set for all SCSI devices) which is hereby incorporated by reference. In view of these differences, reservations are typically managed differently by host systems designed for SCSI2 storage subsystems as compared to host systems adapted for interaction with SCSI3 storage subsystems.

A problem arises where a new storage subsystem supporting SCSI3 reservation protocols is coupled to one or more host systems that provide support only for SCSI2 reservation protocols. It is problematic to require such an older ("legacy") host system to convert its operating system and/or and applications from SCSI2 reservation protocols to SCSI3 reservation protocols. It is therefore evident that a need exists for improved methods and structures to permit effective reservation management for SCSI2 based legacy host applications coupled to SCSI3 storage subsystems.

SUMMARY OF THE INVENTION

The present invention solves the above and other problems, thereby advancing the state of the useful arts, by providing methods and structures for transparently mapping SCSI2 reservation protocol exchanges in a legacy host system into other reservation protocol standards. More specifically, methods and structures of the present invention provide a transparent mapping layer associated with storage management and/or driver software operable in a host a system based on SCSI2 reservation protocols. The mapping element transparently translates SCSI2 reservation protocol requests into corresponding SCSI3 reservation protocol requests. The translated exchanges may then be directed on to SCSI3 based storage subsystems.

A first feature hereof therefore provides a method for mapping SCSI2 reservation exchanges for use in a SCSI3 storage subsystem, the method comprising: receiving a SCSI2 reservation exchange; translating the received SCSI2 reservation exchange into a corresponding SCSI3 reservation exchange; and processing the SCSI3 reservation exchange to manage reservation of an identified portion of storage in the storage subsystem.

Another feature hereof provides a system comprising: a driver operable in a host system for generating SCSI2 reservation protocol exchanges; a storage subsystem adapted to process SCSI3 reservation protocol exchanges; and a translator communicatively coupled to the driver element and communicatively coupled to the storage subsystem, such that the translator is adapted to translate the SCSI2 reservation protocol exchanges received from the driver into the SCSI3 reservation protocol exchanges and such that the translator is further adapted to forward the SCSI3 reservation protocol exchanges to the storage subsystem.

Another feature hereof provides a system for processing SCSI2 reservation requests comprising: driver means operable in a host system for generating SCSI2 reservation requests; and translator means operable in the host system and communicatively coupled to the driver means for intercepting SCSI2 reservation requests and for translating the intercepted requests into SCSI3 persistent reservation requests.

BRIEF DESCRIPTION OF THE DRAWINGS

FIG. 7 is a diagram of an exemplary key decoding and verification aspect hereof.

DETAILED DESCRIPTION OF THE DRAWINGS

Figure 6:
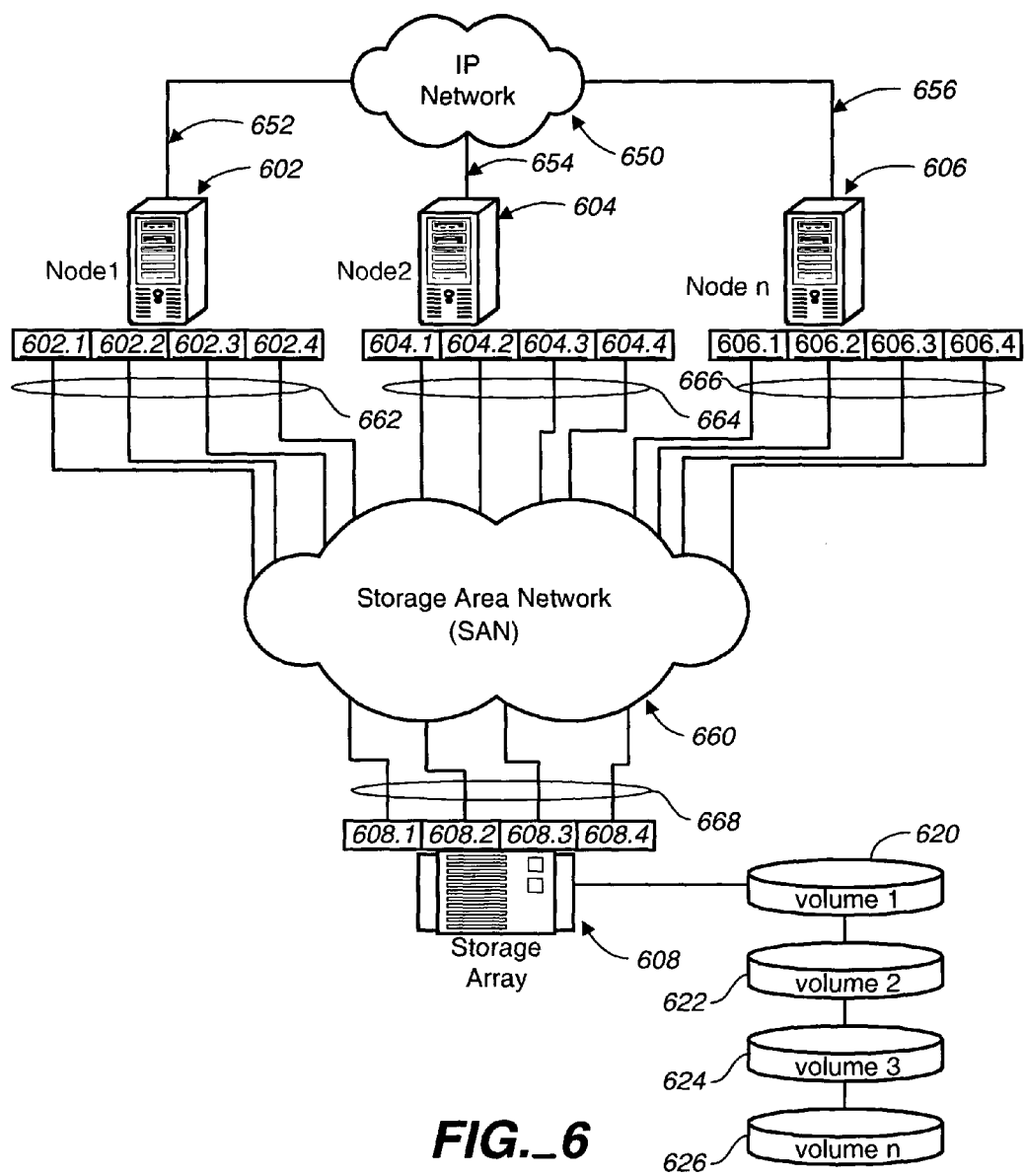
FIG. 6 shows a cluster configuration having multiple paths between each computing node and a storage subsystem in which features of the present invention are applied.

FIG. 6 shows a typical cluster configuration 600 having multiple paths between each computing node 602, 604 and 606 and a storage subsystem 608. Each host system (nodes 602, 604 and 606) may have, for example, four host bus adapters (HBAs)—namely: HBAs 602.1–602.4 associated with node 602, HBAs 604.1–604.4 associated with node 604 and HBAs 606.1–606.4 associated with node 606. The various HBAs may also be referred to herein as 602.n, 604.n and 606.n). Those skilled in the art will understand that any number of HBAs associated with any number of computing nodes may be present in such a cluster computing configuration. Each HBA may be a SCSI initiator, therefore, each host (node) has multiple initiators.

Node 602, 604 and 606 may each include a translation layer in accordance with features and aspects hereof. In addition, some nodes may provide native support for SCSI3 persistent reservation protocols as discussed further herein below. In other words, cluster configuration 600 may be a homogenous group of nodes all having translation layers in accordance with features and aspects hereof or cluster 600 may be a heterogeneous mix of some nodes using a translation feature hereof and other nodes directly supporting SCSI persistent reservation protocols.

In addition to the indicated SCSI HBA interfaces and associated communication, the host nodes 602, 604 and 606 may exchange information via IP network 650 via paths 652, 654 and 656, respectively. The IP network communication exchanges may include general interprocess communications (i.e., remote procedure calls, network sharing of data, dedicated client/server protocol exchange, etc.).

All HBAs (602.n, 604.n and 606.n) are connected to a storage area network 660 (SAN) via associated paths 662, 664 and 666, respectively. A SAN is often implemented with Fibre Channel (FC) switches though other devices and associated protocols are also used including, for example, Infiniband and other commercially available devices and protocols. SAN 660 may also be implemented as an IP network using well known Ethernet or other communication media and protocols. Such a SAN architecture may use, for example iSCSI exchanges to exchange SCSI command and status information over an IP network medium and protocol.

The SAN 660 connects the nodes (602, 604, 606) to the storage sub-system 608. The storage subsystem may also have a plurality of ports coupling it to the SAN. For example, as shown in FIG. 6, storage subsystem 608 has four ports (608.1–608.4). Such multiple ports on the storage subsystem may also be referred to as multiple target ports or the subsystem may be referred to as a multiple-target-ports device. Each host port of the storage subsystem is a SCSI target.

As is common in larger storage subsystems, the storage subsystem of FIG. 6 has a plurality of volumes 620–626. A "volume", as used herein, refers to a logical partitioning of storage capacity of the storage subsystem. The storage subsystem includes a plurality of physical storage elements (i.e., disk drives—not shown). A volume is therefore a logical grouping of storage capacity from one or more of the storage elements of the subsystem. A volume may comprises any portion of the storage on each of the one or more storage elements.

As allowed by SCSI standards and protocols, each volume may be referenced by a host system using a logical unit number (LUN). It is often said that the volume is "mapped" in the host system to a LUN. The LUN is an indicia used in accordance with SCSI protocols to identify the particular volume being requested by the host system I/O request.

In general, host systems using SCSI interfaces to storage systems send inquiry related commands out on each HBA to discover what peripheral devices are attached thereto. In the multiple target/initiator cluster environment shown in FIG. 6, each host may discover each LUN 16 times–4 HBAs/host×4 ports/subsystem. In other words, the combination of 4 HBA in a host providing 4 distinct physical paths for information exchange with that host and 4 distinct physical paths in the subsystem provides 16 possible physical paths for exchange of information between any host and a LUN of the storage subsystem. Fibre Channel switches sometimes offer "zoning" features to preclude such duplication in discovery of the LUNs of a storage subsystem by a host computing node. However, numerous SCSI applications do not include such features or may not use them for any of several reasons.

Providing such multiple physical paths to a LUN offers advantage in reliability and performance. For example, the host node may perform I/O load balancing by distributing I/O request processing over the multiple physical paths between the host and a particular LUN. The host would, in essence, send I/O requests in parallel through all physical paths between the host system and the identified LUN. Multiple paths may improve reliability in that if one path failed, the host may use the remaining operable paths to access data on the LUN.

In cluster computing environments, reservations are used to ensure temporary exclusive access by one node to a LUN of the storage subsystem. SCSI2 reservation protocol exchanges are based on an ITL nexus (Initiator Target LUN)—i.e., a reservation is made by a given initiator via a specific target port to a particular LUN. Only one path can be used to issue I/O even that the LUN has, for example, 16 paths. The reserved LUN is reserved in such a manner that no other path, even from the same initiator, may access the LUN. If the reserved path is down (e.g., an HBA problem, connector problem or cable problem), the data with the storage array becomes unavailable despite the availability of alternate paths between the initiator and the affected LUN. By contrast, SCSI3 persistent reservation protocol exchanges associate a key value (a unique ID) with a particular persistent reservation. Any path from an initiator may utilize the reserved LUN by using the associated key value.

In accordance with features and aspects hereof, a translator layer (discussed further herein below) associated with driver software in each node (602, 604 and 606) translates SCSI2 reservation protocol exchanges into corresponding SCSI3 persistent reservation exchanges. This translation feature enables use of the enhanced flexibility and recovery features of SCSI3 reservation in host systems (nodes) that otherwise would only support SCSI2 reservation features. With the translation feature, application I/O requests can be sent via all paths between a node the storage system. When a path of multiple possible paths is unavailable, application I/O requests can still can still be sent from a node to a reserved LUN of the storage subsystem through remaining available paths.

Figure 1:
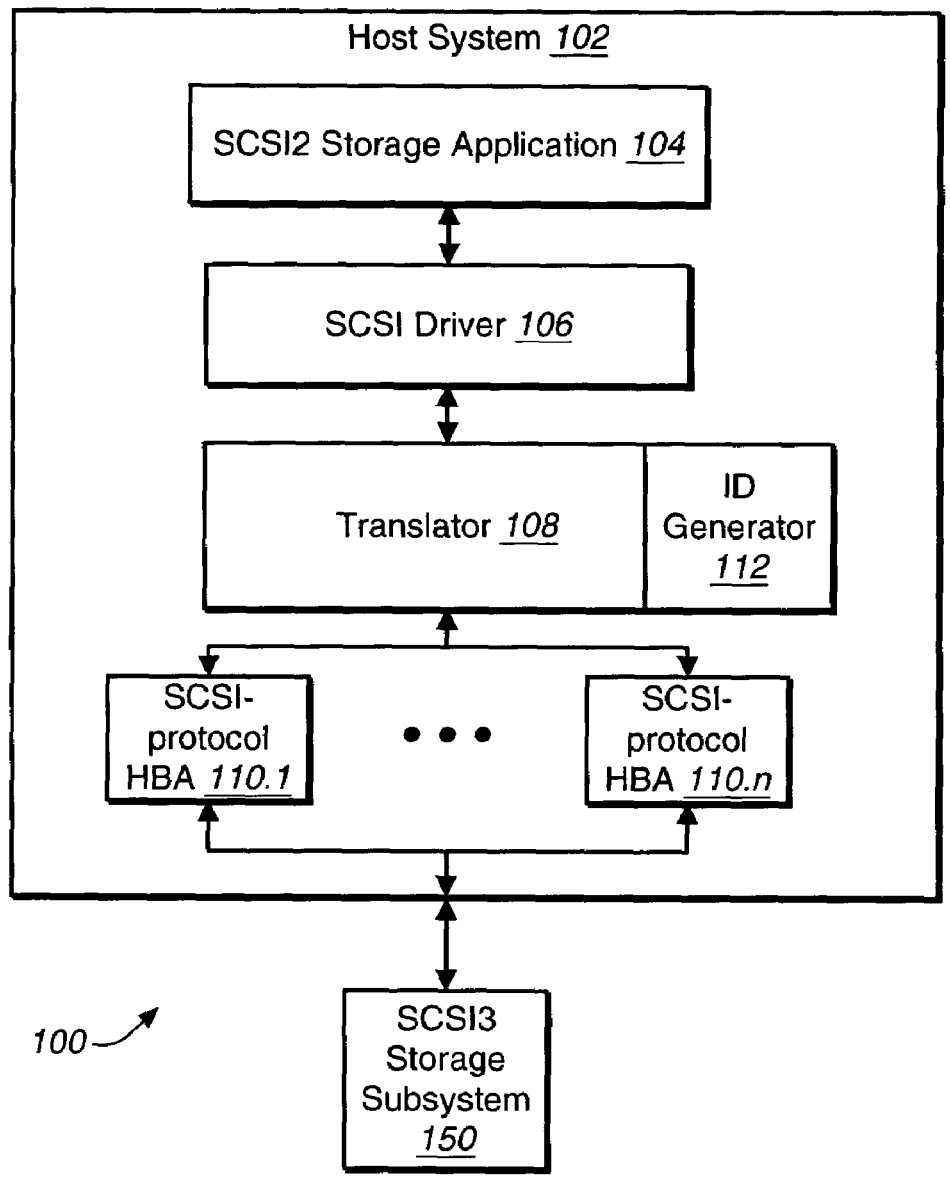
FIG. 1 is a block diagram of a system in which features and aspects hereof are advantageously applied.

FIG. 1 is a block of diagram of an exemplary system 100 (i.e., a node such as in FIG. 6) embodying features and aspects hereof. As noted above, a storage subsystem 150 may support numerous SCSI3 commands and features. A particularly valuable feature of a SCSI3 storage subsystem applied in cluster computing environments derives from support for persistent reservation protocols. Persistent reservation protocols are particularly advantageous in cluster computing environments where a plurality of host systems 102 are coupled to a shared storage subsystem 150. The persistent reservation protocols defined and supported by SCSI3 specifications simplifies coordination of such multiple hosts competing for temporary exclusive access to one or more portions of one or more shared storage subsystems.

By contrast, SCSI2 specifications defined an earlier implementation of reservation protocols involving simpler commands. A Reserve command requested reservation of a particular identified portion of an identified storage subsystem. A Release command from the same initiator (same HBA) releases the previously granted exclusive access. However, as noted above, these simpler commands are inadequate for effective sharing of storage subsystems in a cluster environment where multiple paths may be present between a host node and the storage subsystem. In particular, SCSI2 reservation protocols may result in access to a LUN being locked out from all host system nodes if the path on which the reservation was established should fail. Although other paths may exist between the LUN and the node that requested the reservation, SCSI2 reservation protocols may preclude use of the additional paths for access to the LUN.

In addition, if the node that requested the reservation should fail without releasing the reservation, the reservation may remain active within the storage system. In general, SCSI2 reservation protocols may require that the storage subsystem be fully reset to relinquish all granted reservations regardless of which host had requested the reservation. In other words, all reservations would be released by such a reset and valid reservations would then be re-established. SCSI3 persistent reservation exchanges avoid this problem by allowing any number of paths to be used between a node and a reserved LUN of the storage subsystem.

One aspect hereof provides translator 108 for translating SCSI2 reservation protocol exchanges into corresponding SCSI3 reservation protocol exchanges better suited to cluster computing environments. More specifically, translator 108 may be provided as an installable driver level element adapted to interface between standard SCSI driver 106 and corresponding host bus adapters (HBAs) 110.1 through 110.n. HBAs 110.1 through 110.n may be any bus adapter appropriate to couple to a medium on which SCSI protocol exchanges may be performed including, for example, Fibre Channel HBA, iSCSI HBA (SCSI over IP), parallel SCSI, or other such media.

Host system 102 may include SCSI2 compliant storage application 104 that generates storage related requests as SCSI2 commands and forwards those requests to a SCSI driver 106. SCSI driver 106 would previously transfer SCSI commands directly to corresponding HBAs 110.1 through 110.n. By contrast, in accordance with features and aspects hereof, translator 108 intercepts such requests and translates the intercepted SCSI2 based reservation protocol exchanges into corresponding SCSI3 persistent reservation exchanges. As discussed further herein below, translator 108 may include ID generator 112 adapted to generate unique IDs (keys) for managing persistent reservations requested by translator 108 of storage subsystem 150 on behalf of driver 106. The unique IDs generated for such exchanges are useful, for example, as keys in SCSI3 persistent reservation exchanges to associate within the storage subsystem particular granted reservations with the requesting systems. This association aspect of SCSI3 persistent reservation standards helps avoid problems inherent in SCSI2 reservation protocols for releasing granted reservations for improperly terminated host applications.

Those of ordinary skill in the art will readily recognize that system 100 is intended merely as exemplary of numerous equivalent structures that may embody translation features and aspects hereof. For example, translator 108 may be implemented, as depicted in FIG. 1, as a loadable driver module integrated with operating system driver software to intercept and translate reservation protocol exchanges. Alternatively, translator 108 and associated ID generator 112 may physically reside in other elements of system 100 as a matter of design choice. In one particular aspect hereof, translator 108 may be integrated as a multi-path proxy (MPP) driver in a Linux operating system. Such an architecture provides that the MPP driver layer may be dynamically or statically configured within the operating system kernel. The MPP driver layer intercepts information directed among the various other layers of operating system software including, for example, the SCSI driver portions of the operating system. The intercepted requests for reservation protocol exchanges are translated as required and forwarded back into the appropriate communication paths among the various operating system layers. Translator 108 may therefore perform its translation functions transparently with respect to other elements and layers of the host system 102. Thus, translation features and aspects hereof may be integrated with legacy systems and applications without the need for substantive changes to the underlying legacy application and system architectures and, in particular, without the need to re-program elements of the system 102.

Further, it may be noted that numerous other layered definitions of software components within host system 102 may advantageously apply features and aspects hereof. Various additional layers may be defined providing different functional decompositions of such a system 102. Regardless of the particular choice of layered structures, translator 108 may intercept reservation related protocol exchanges generated within SCSI2 based system 102 and translates such intercepted requests into corresponding SCSI3 persistent reservation requests. Still further, those skilled in the art will recognize that HBAs 110.1 through 110.n may represent any host bus adapters capable of providing desired interaction between the host system and a SCSI3 compliant storage subsystem 150. In particular, HBAs 110.1 through 110.n may be any heterogeneous mix of HBAs useful for achieving the desired purpose and adapted to provide aspects and features hereof.

One benefit hereof derives from the translation process residing within elements of attached a host systems. As noted above, one aspect hereof provides for the translation element to be dynamically or statically linked with an operating system kernel in association with a device driver such as a SCSI2 a storage device driver. By so integrating the translation element hereof within a SCSI2 based system, a storage subsystem in a clustered environment may be capable of providing support for a heterogeneous mix of legacy systems using SCSI2 based reservation protocols as well as updated systems utilizing SCSI3 persistent reservation protocols.

Figure 2:
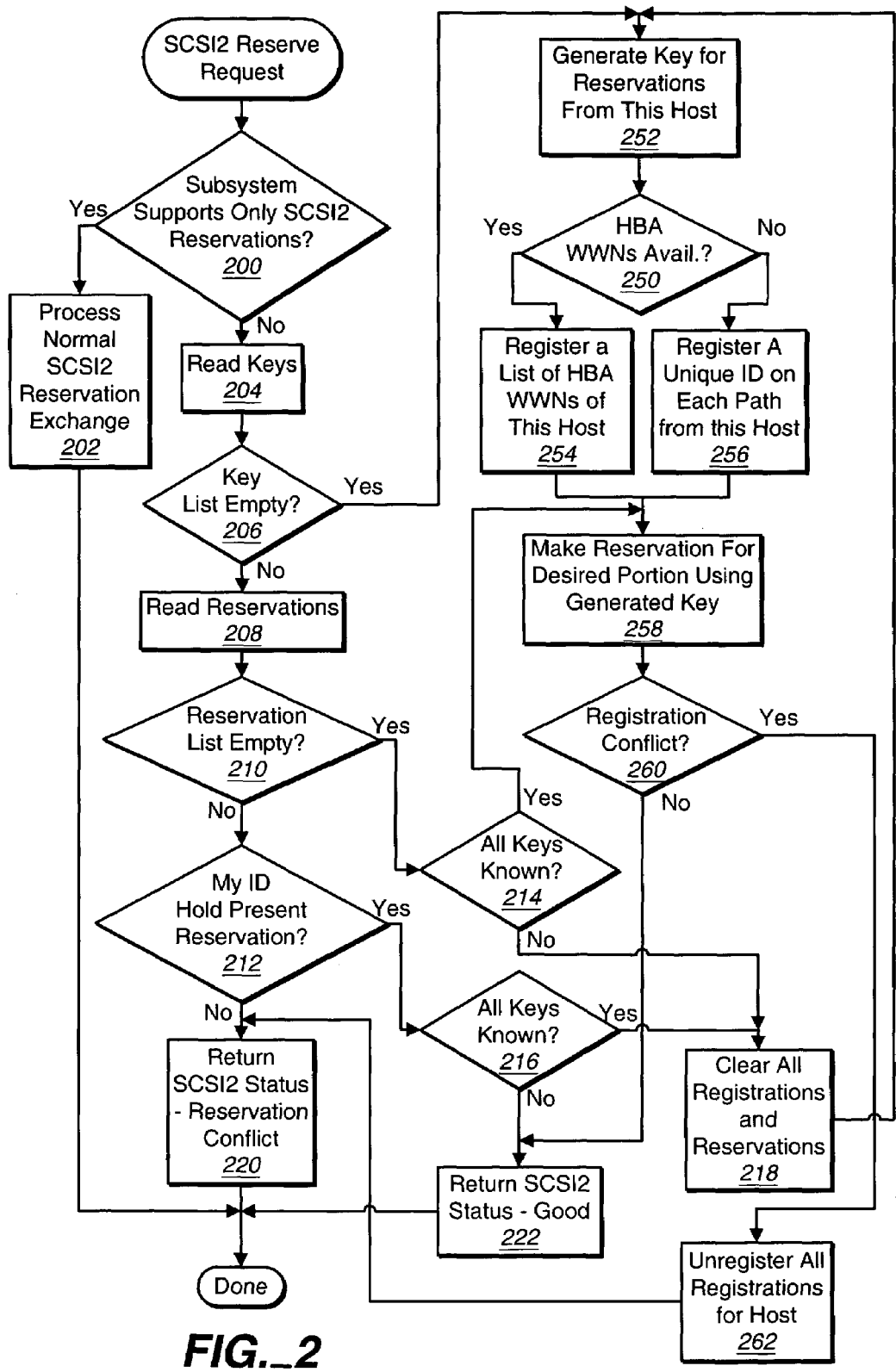
FIG. 2 is a flowchart describing an aspect hereof to translate a reservation request.

FIG. 2 is a flowchart describing aspects of a method hereof for processing a SCSI2 reservation protocol Reserve request intercepted by a translation layer as described above. The translation layer, in general, translates such intercepted SCSI2 reservation protocol exchanges into corresponding SCSI3 persistent reservation protocol exchanges. In general, features and aspects hereof receive SCSI2 reservation protocol exchanges and generate corresponding sequences of SCSI3 persistent reservation protocol exchanges. Persistent reservation protocol exchanges involve use of the SCSI3 Persistent Reservation (PR) Out command and the PR In command. The PR Out command is generally used to send requests from a host the system to the SCSI3 compliant storage subsystem while PR In commands are generally used to receive information back from the SCSI3 compliant storage subsystem. PR In and PR Out commands both include numerous parameters including a Service Action code indicating the specific action requested in the persistent reservation exchange. In addition, a key value is used to identify each reservation and to identify initiators that relate to the reservation. Key values are registered using specific Service Action codes in PR Out commands and may be retrieved by Service Action codes in PR In commands. In like manner, reservations may be requested and cleared by PR Out commands with appropriate Service Action codes and may be read or retrieved by PR In commands with appropriate Service Action codes. Detailed information regarding the specific persistent reservations protocols, commands, service action codes, keys and other related information is provided in the SCSI3 specifications incorporated above.

Element 200 is first operable in response to receipt of a SCSI2 Reserve request directed to a logical unit to determine whether the storage subsystem containing the addressed logical unit can accept only SCSI2 reservation protocols. All SCSI2 and SCSI3 devices can support SCSI2 reservation protocol exchanges. Only SCSI3 devices provide support for SCSI3 persistent reservation protocol exchanges. Still further, a SCSI3 system that has processed a SCSI2 reservation for the addressed LUN can only process further SCSI2 reservation exchanges for that LUN.

In one aspect, this test may be performed by transmitting a SCSI3 PR In command with an Action Code of Report Capabilities. If the storage system supports only SCSI2 reservation exchanges, a SCSI Check Condition status with sense key Illegal Request may be generated and returned. If the SCSI3 storage system has already reserved the identified LUN with a SCSI2 reservation command, a Reservation Conflict status may be returned. Those skilled in the art will recognize other equivalent tests to determine whether a SCSI3 persistent reservation exchange may be performed for the addressed LUN or if a SCSI2 reservation must be performed.

If the addressed LUN can only support a SCSI2 request, element 202 is operable to perform standard SCSI2 reservation protocol exchange in accordance with known techniques therefor. If the storage subsystem may accept a SCSI3 persistent reservation exchange, element 204 utilizes the PR In command with a Service Action code requesting return of all presently registered keys known to the addressed storage subsystem and associated with the identified LUN. As documented in the SCSI3 standard specifications, utilization of SCSI3 persistent reservation protocol exchanges requires that the requester of a reservation first register with the storage subsystem. This registration associates a unique key with the reservation requester within the storage subsystem. In the case of a cluster computing environment, communication paths may exist between each of multiple hosts and each of multiple storage subsystems. The key may in such cases identify not only a particular host system but may also identify a particular communication path associated therewith.

Element 204 is therefore operable to retrieve a list of all registered keys presently known to be associated with the identified LUN in the storage subsystem. Element 206 next determines if the list of known keys returned is empty—i.e., no keys are presently registered with the storage subsystem. If no keys are presently registered, processing continues at element 252 as discussed further herein below to generate appropriate keys, register the requesting host, and submit an appropriate reservation request using the registered key. If the list of registered keys returned by operation of element 204 is determined not to be empty by element 206, element 208 is next operable to read a list of all presently known reservations from a storage subsystem. Element 210 then determines whether the returned list of presently known reservations is empty. In other words some keys have been registered but no reservations are presently active within the storage subsystem. If the reservation list is so determined to be empty, processing continues with element 214 to determine whether all keys in the returned list of registered keys are known to be associated with the host system from which this request is originating. If all registered keys are known to this host system, processing continues with element 258 as discussed further herein below to complete translation processing of the desired reservation. If some registered keys are not known to this host system, element 218 is operable to clear all key registrations and reservations associated with this host system. Processing then continues with element 252 as discussed further herein below.

If element 210 determines that some reservations are returned in the reservation list by element 208, element 212 is then operable to determine whether the storage portion identified in the desired reservation is already reserved by another host system. If the present host system is so determined to be the only system presently holding an active reservation covering in the desired portion of the storage subsystem, element 216 is then operable as was element 214 to determine whether all registered keys are known to this host system. If so, the host system already controls the reserved portion requested by the reservation request. Element 222 therefore returns a "good" SCSI2 completion status to the requesting SCSI2 compliant operating system driver and application layers thereby completing translation processing of the reservation request. If element 216 determines that some registered keys in the list are not associated with this host system, element 218 is then operable to clear all present registrations and reservations associated with this host system. Processing then continues at element 252 as discussed further herein below.

If element 212 determined that another system presently holds the reservation to the storage subsystem portion identified in the present reservation request, element 220 is operable to return a "failure" SCSI2 status to higher layers of the host system. The error status may indicate, for example, a reservation conflict in the requested reservation such that the reservation is not granted to the present requesting host system. Some other host system may already have an active reservation of the requested portion of the storage subsystem.

If element 206, as discussed above, determines that the retrieved list of registered keys is empty or if element 218, as discussed above, is operable to clear all present registrations and reservations of the host system, element 252 is next operable to generate a unique key for the requested reservation from this host a system. Generation of such a unique key is discussed further herein below. In general, such a unique key may include features associated with a unique identifier already associated with the requesting host system. The key therefore may identify the host system from which the reservation request issued. In addition, in accordance with features hereof, the unique key may include a signature portion that indicates generation and use of the key by the translation layer. Methods and structure hereof discussed further below may therefore determine from a key whether it is associated with a particular host and whether it was generated by a translation layer.

As is generally known in the art, HBAs and/or host systems that use Fibre Channel fabric architecture for information exchange may have a worldwide name (WWN) associated therewith. The WWN uniquely identifies the system or HBA component with an ID that is globally unique within the scope of a defined enterprise. Element 250 next determines whether the WWN for all HBAs in the requesting host system are known to the translation layer of the requesting host system. If so, element 254 registers a list of all known HBAs in the requesting host system utilizing the generated key as an identifier associated with each of the WWNs. In particular, element 254 may issue a PR Out command with a Register service action code. The SPEC_I_PT parameter of the Register service action may be set to indicate that a list of unique keys is supplied with the request. The list may contain a generated unique key for each path from the requesting host system to the identified LUN. The generated key for each such path may include the WWN of the HBA associated with the path. Additional details of such key generation are provided herein below. Processing then continues at element 258 as discussed further herein below.

If element 250 determines that the WWNs for all HBAs on the requesting host system are not known to the translation layer, element 256 is operable to generate a single unique key for the host system and to then forward the Register request over each path from the host to the LUN. Each path from the requesting host to the LUN therefore shares the same unique key for purposes of using the LUN to be reserved. The WWN may be unknown to the translation layer if, for example, the HBAs and associated paths to the LUN do not use Fibre Channel or other media/protocols that utilize such WWN identifiers. More specifically, element 256 may generate such a unique key as discussed further herein below. The generated key is then sent as a parameter in a PR Out command with a Register service action code on each path from the requesting host to the identified LUN. The SPEC_I_PT parameter may be cleared to indicate that only a single key parameter is supplied. Each Register request records within the storage system controlling the LUN the unique key as associated with the initiator port from which the request originates. However, since each path (i.e., each initiator port) registers using the same unique key, each path from the requesting host to the identified LUN may be used to access the LUN about to be reserved. Processing then continues with element 258.

Element 258 is next operable following registration of desired keys (or following determination by element 214 that all presently registered keys are known to this host system). Element 258 generates appropriate PR Out commands requesting the Service Action to record the persistent reservation using the generated key. Element 260 then determines whether the requested persistent reservation has returned a reservation conflict error indication. If so, element 262 is operable to unregister all presently recorded registrations associated with this host system in the storage subsystem. In essence, elements 260 and 262 are operable to prevent errors due to race conditions between two independent host systems. If, for example, a first host system and a second host system operating independently both reach processing at element 204 at substantially the same time, each in response to respective SCSI2 reservation request, a race condition arises. Each host system will believe it may proceed with the desired reservation request. However, only one of the two hosts will successfully complete its desired reservation. The other host system will instead receive a Reservation Conflict return status. Hence, processing of elements 260 and 262 will detect such a status and process it appropriately.

After processing such a error status, processing then continues with element 220 to return a reservation conflict error status to the requesting SCSI2 compliant system layers. If element 260 determines that no error was generated by the requested reservation, element 222 is operable to return a good completion status to the SCSI2 system layers.

Figure 3:
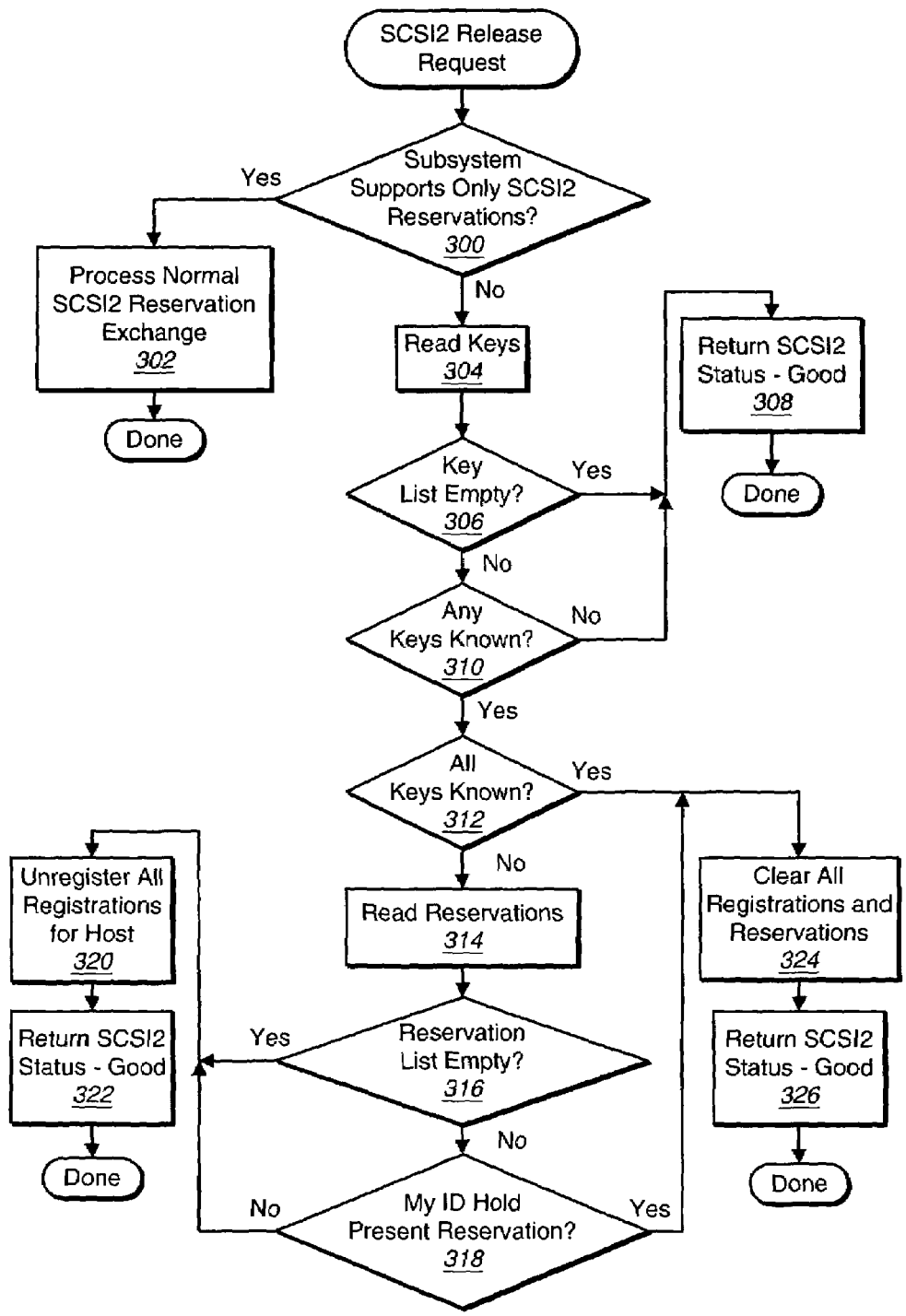
FIG. 3 is a flowchart describing an aspect hereof to translate a reservation release request.

FIG. 3 is a flowchart describing aspects hereof to provide translation of a SCSI2 compliant reservation Release request into a SCSI3 compliant persistent reservation protocol exchange. Similar to elements 200 and 202 discussed above with respect to FIG. 2, 300 and 302 of FIG. 3 first determine whether the addressed storage subsystem is capable of processing SCSI3 persistent reservation protocol requests or must, at present, accept only SCSI2 reservation exchanges. As discussed above, a SCSI3 PR In Report Capabilities request may be used for such a test. If only SCSI2 reservations may be processed, element 302 is operable to perform standard SCSI2 compliant processing as known in the art to release the identified reservation. Otherwise, processing continues with element 304 to provide the desired translation to corresponding SCSI3 compliant persistent reservation protocol exchanges.

Element 304 issues a PR In command requesting return of all registered keys from the storage system. Element 306 then determines whether the returned list of registered keys is empty. If so, element 308 is operable to return a "good" status to requesting SCSI2 compliant layers. If element 306 determines that the registered key list is not empty, element 310 next determines whether any of the returned registered keys are known to the present host system. If not, element 308 is operable as above to return a "good" completion status to requesting layers of the host system. If no keys are presently registered with the identified storage system or if none of the registered keys are known to the presently requesting host system, the Release request can be, in essence, ignored and therefore a "good" status returned to the higher layers in the host system operation.

If some keys returned in the registered key list are known to the present host system, element 312 next determines whether all keys in the returned key list are known to the present host system. If so, element 324 is operable to clear all key registrations and reservations associated with the present host system. Element 326 then returns a "good" completion status to the requesting SCSI2 layers. If some of the returned registered keys are known to this host system (as determined by element 312 above), element 314 is then operable to read a list of all present reservations from the identified storage system. If element 316 then determines that the returned reservations list is empty, element 320 is operable to unregister all registered keys associated with the present host system. Element 322 then returns a "good" completion status to the SCSI2 compliant system layers. If element 316 determines that the reservation list returned is not empty element 318 next determines if the reservation is related to the requesting host system. If so, elements 324 and 326 are operable as discussed above to clear all present registrations and reservations of this host system and to return a "good" completion status. If the reservations in the returned list are not controlled by the requesting host system, elements 320 and 322 are operable to unregister all present registered keys of the host system to return a "good" completion status as noted above.

Figure 4:
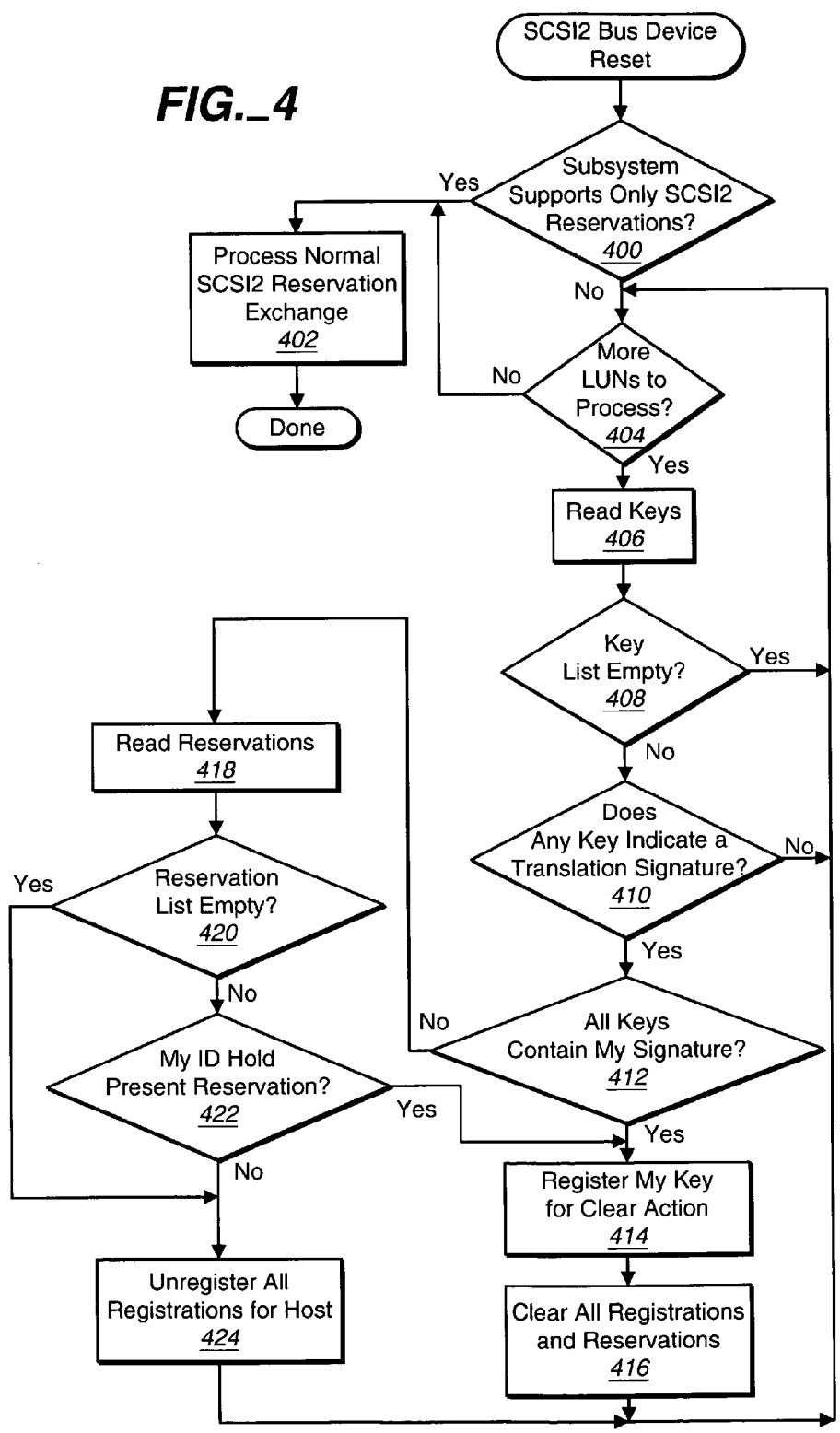
FIG. 4 is a flowchart describing an aspect hereof to translate a device bus reset request.

In accordance with SCSI2 reservation protocol exchanges, a SCSI Bus Device Reset may be issued to clear reservations generated by a host system that has abnormally terminated operation without releasing its presently held reservations. FIG. 4 is a flowchart describing a method hereof for translating a SCSI2 Bus Device Reset used to clear remaining reservations of an aborted host system into corresponding SCSI3 persistent reservation protocol exchanges.

As above with respect to elements 300 and 302 of FIG. 3 and elements 200 and 202 of FIG. 2, elements 400 and 402 are operable to determine whether SCSI2 reservation exchanges must be used for the identified LUN or if SCSI3 translation is possible for this request. As noted above, a SCSI3 PR In Report Capabilities request may be used for such a test. If the identified LUN is at present only capable of supporting SCSI2 reservation protocol exchanges, element 402 processes the request according to present SCSI2 reservation standards. Otherwise, elements 404 through 424 are iteratively operable for all logical units associated with the identified storage subsystem. In particular, element 404 determines whether the additional logical units remain to be processed. If not, the method of FIG. 4 completes. If additional logical units remain for processing, element 406 is next operable to read a list of registered keys from the storage subsystem. As discussed above with respect to FIGS. 2 and 3, reading of such keys may be accomplished utilizing the SCSI3 PR In command with a Service Action code requesting the return of all registered keys known to the storage subsystem.

If element 408 next determines that the returned list of registered keys is empty, processing loops back to element 404 to process the next logical unit, if any. Otherwise, element 410 next determines whether any of the returned registered keys contain signature information indicating that the key was generated by a translation element within some host system of the cluster configuration. As discussed further herein below, a unique key generated by a translation layer in accord with features and aspects hereof includes a signature portion that indicates that the key was, in fact, generated by some translation layer. Examples of such a signature are discussed further herein below. In general, the signature may be any value that is likely to be associated only with a translation layer. Such a signature is useful in the unique key generated for a reservation request so that reservations generated by a translation layer may be distinguished from reservation registrations using keys generated by host systems that provide full support for SCSI3 persistent reservation protocols. Persistent reservations generated from host systems that directly support SCSI3 reservations should not be cleared by the translation processing of this FIG. 4. Rather, only reservations generated by this host system's translation layer should be cleared.

If element 410 determines that none of the returned registered keys include a signature indicating generation some translation layer, processing continues by looping back to element 404 to process a next logical unit. Otherwise, element 412 is next operable to determine whether all the returned registered keys contain a signature indicative of generation by the present host system. If so, elements 414 and 416 are operable to register the generated key for the present host system in preparation for issuance of a Clear Service Action code for all present key registrations and reservations associated with this host the system. Processing continues by looping back to element 404 to process additional logical units, if any.

If element 412 determines that some returned registered key does not contain the signature of the translation layer, element 418 is operable to read the list of all presently active reservations from storage subsystem. Element 420 then determines whether the returned reservation list is empty and, if so, element 424 is operable to unregister all present key registration associated with the translation layer. If some present reservation is returned in the list as determined by element 420, element 422 then determines whether any of the returned reservations indicate generation by the translation layer (as indicated by recognition of signature information in the key associated with each reservation). If some reservation indicates the signature of the translation layer, elements 414 and 416 are operable as discussed above to clear all present key registrations and reservations associated with the translation layer. If not, element 424 is operable as discussed above to merely unregister all presently registered keys associated with this host system. In both cases, processing continues by looping back to element 404 to process additional logical units, if any.

When element 404 determines that no further LUNs need be processed by the present bus device reset translation, element 402 is operable to complete the bus device reset process according to standard SCSI2 command processing standards. The translation layer, in essence, intercepts the bus device reset request, performs necessary SCSI3 reservation related processing to clear persistent reservations made on the device to be reset and then must complete the remainder of standard SCSI2 resetting for the targeted device.

Those of ordinary skill in the art will recognize a variety of equivalent method steps and storage related SCSI command sequences is that may be utilized in implementing features and aspects hereof. The methods of FIGS. 2 through 4 are therefore intended merely as representative of exemplary implementations of beneficial features and aspects hereof.

Figure 5:
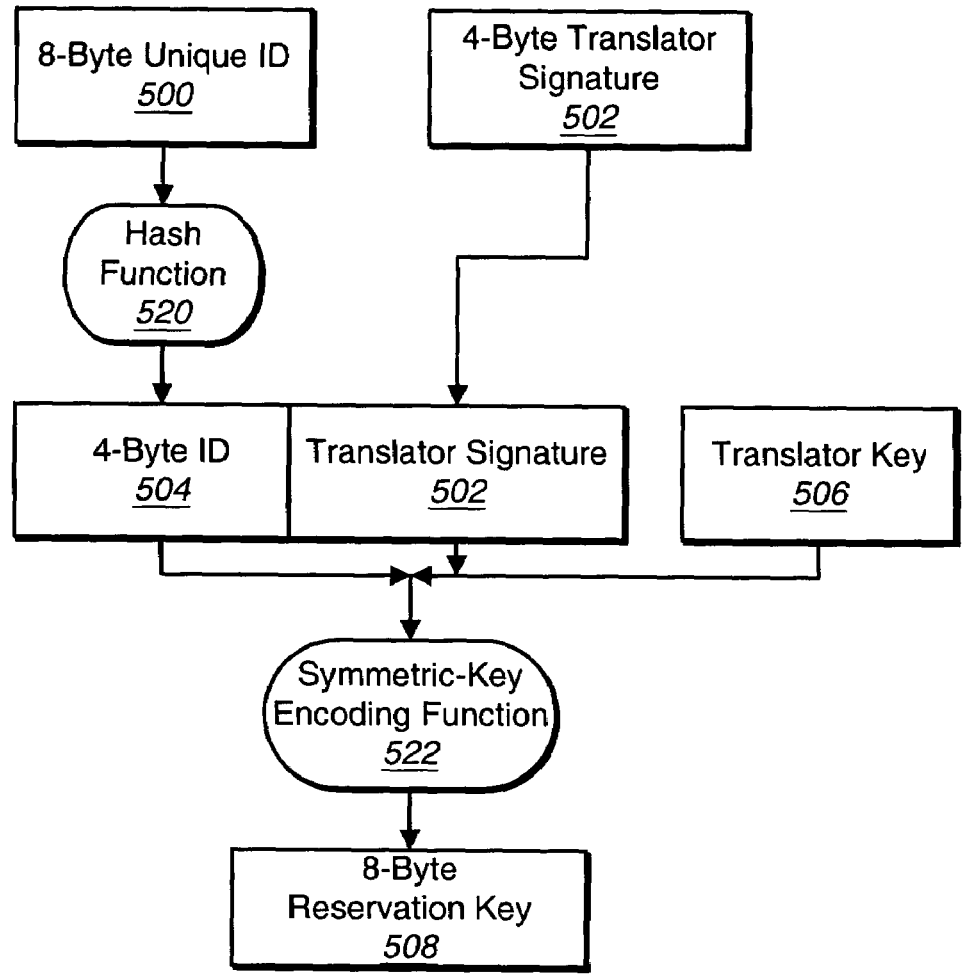
FIG. 5 is a diagram of an exemplary key generation and encoding aspect hereof.

In translation of SCSI2 reservation exchanges into SCSI3 persistent reservation exchanges, unique IDs or keys may be generated and used to associate the requesting host system with a persistent reservation established in the storage subsystem. FIG. 5 depicts one exemplary representation of the generation of such a unique key. In accord with the SCSI3 specification, the key may be 8 bytes in length. In the exemplary key generation of FIG. 5, an 8-byte unique ID 500 may be generated by any appropriate technique. For example, the worldwide name (WWN) of the host system and/or of an HBA associated with the host system may be used as such an 8-byte unique ID. The 8-byte unique ID 500 may be hashed using hash function 520 to generate a 4-byte ID 504. This 4-byte ID may then be combined (concatenated) with the 4-byte signature sequence 502 of the MPP translator layer hereof. The MPP signature 502 may be a predetermined sequence useful to help recognize the concatenated 8-byte value as one generated by an MPP layer. The hashed 4-byte ID 504 helps identify the generated key as generated by the MPP translator layer of this particular system. For added security, the 8-byte sequence represented as the concatenation of 4-byte ID 504 and 4-byte MPP signature 502 may then be further encoded by symmetric-key encoding function 522 using translator key 506 as an encoding password. The symmetric encoding function 522 generates the 8-byte reservation key 508 for use in associating particular persistent reservations in the storage subsystem with particular MPP translator layers operable in particular host systems or in conjunction with particular HBAs. The symmetric encoding function 522 may be any 2-way (reversible) encoding technique that allows the 8-byte reservation key 508 to be determined from the concatenation of elements 504 and 502 and vice versa.

In determining whether a registered key returned from a storage subsystem was generated by the requesting host, the 8-byte reservation key is decoded through the symmetric key encoding/decoding function to restore its two 4-byte constituents and comparisons made with the decoded result. FIG. 7 is a diagram describing the data involved in such decoding and verifications. An 8-byte reservation key 702 received from a storage system in response to a read key request is applied to the symmetric encoding function 522 (as above) along with the translator key 506 as above. The result is an 8-byte value comprising a 4-byte ID of the host system 706 and a 4-byte signature field 708.

To determine whether the key received from a storage system is generated by a translator layer of some host (as discussed in FIG. 4 above), the signature 706 derived from the retrieved key is compared by element 712 against the known signature value 502. If the two signature values are equal, the key 702 is one generated by a translation layer. If not, the key is not likely generated by a translator layer but rather represents a key generated by a host system directly supporting SCSI3 persistent reservations and hence, generating its own 8-byte key values without a translator signature embedded therein.

In addition, if the above comparison indicates that the key is generated by some translator layer, the decoded key may include a 4-byte ID 706 that identifies the host system whose translator generated the received 8-byte key 702. The 4-byte ID 706 may be compared to the 4-byte ID 704 generated by hashing (720) the unique 8-byte ID 700 of the host (i.e., the WWN or other unique ID associated with the host or the HBA). If the two 4-byte IDs match as determined by element 710, the reservation key may be presumed to be generated by this host system. Otherwise, the reservation key is likely from another host system with another translator.

Those of ordinary skill in the art will recognize a wide variety of generation, encoding, decoding and verification techniques useful for generating a unique ID for use in SCSI3 persistent reservation protocol exchanges. FIGS. 5 and 7 are therefore intended to represent merely one exemplary technique useful to associate keys generated by the translator hereof with particular persistent reservations. This exemplary key generation and verification is also particularly useful to help distinguish such translator generated IDs from those generated by host systems directly supporting SCSI3 persistent reservation protocol exchanges.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for mapping SCSI2 reservation exchanges for use in a SCSI3 storage subsystem wherein the subsystem is coupled to an application that supports only SCSI2 reservation exchanges and wherein the subsystem is also adapted to be coupled to one or more applications that directly support SCSI3 persistent reservation exchanges; the method comprising:

receiving a SCSI2 reservation exchange via an associated path wherein the SCSI2 reservation exchange is generated by a SCSI2 application that supports only SCSI2 reservation exchanges;

generating a unique identifier identifying the associated path;

translating the received SCSI2 reservation exchange into a corresponding SCSI3 reservation exchange using the unique identifier wherein the step of translating is transparent to the SCSI2 application; and processing the SCSI3 reservation exchange to manage reservation of an identified portion of storage in the storage subsystem wherein the step of processing is transparent to the SCSI2 application.

2. The method of claim 1 wherein the step of processing comprises:

forwarding the SCSI3 reservation exchange to the storage subsystem.

3. The method of claim 1 wherein the step of translating comprises:

translating the received SCSI2 reservation exchange into a corresponding SCSI3 persistent reservation protocol exchange.

4. The method of claim 3 wherein the step of generating the unique identifier further identifies a requesting host, and the step of translating to a SCSI3 exchange comprises:

determining whether the unique identifier is known to the storage subsystem;

registering the unique identifier within the storage subsystem; and translating a received SCSI2 reservation request into a corresponding SCSI3 persistent reservation reserve request using the unique identifier.

5. The method of claim 4 further comprising:
translating a received SCSI2 release request into a corresponding SCSI3 persistent reservation clear request using the unique identifier.

6. The method of claim 5 further comprising:
translating a received SCSI2 bus device reset request into a corresponding SCSI3 persistent reservation clear request using the unique identifier.

7. The method of claim 4 wherein the step of generating a unique identifier further comprises:
generating said unique identifier further identifying a WWN associated with the requesting host.

8. The method of claim 4 wherein the step of generating a unique identifier further comprises:
generating said unique identifier further identifying a WWN associated with an HBA of the requesting host.

9. The method of claim 4 herein the step of generating a unique identifier further comprises:
generating said unique identifier further identifying a signature value indicative of a translation layer driver wherein the signature value serves to distinguish the translated SCSI3 persistent reservation reserve request from a request generated by another device that directly supports SCSI3 persistent reservation protocol exchanges.

10. A system comprising:
a driver operable in a host system for generating SCSI2 reservation protocol exchanges;
a storage subsystem adapted to process SCSI3 reservation protocol exchanges;
an ID generator that generates a unique identifier identifying the associated path of the said SCSI2 reservation protocol exchanges; and
a translator communicatively coupled to said driver element and communicatively coupled to said storage subsystem and communicatively coupled to said ID generator, wherein said translator is adapted to translate said SCSI2 reservation protocol exchanges received from said driver into said SCSI3 reservation protocol exchanges using the unique identifier and wherein said translator is further adapted to forward the SCSI3 reservation protocol exchanges to said storage subsystem,
wherein the translator and ID generator are operable transparently with respect to the driver, and
wherein the system is adapted to process SCSI3 reservation protocol exchange from said driver directed to said storage subsystem and is further adapted to process SCSI3 reservation protocol exchanges received from other sources that directly support SCSI3 reservation protocol exchanges and directed to said storage subsystem.

11. The system of claim 10 wherein the ID generator is configured to generate a host identifier portion.

12. The system of claim 10 wherein the ID generator is configured to generate a host bus adapter identifier portion.

13. The system of claim 10 wherein the ID generator is configured to generate a signature portion indicating generation by said translator wherein the signature value serves to distinguish the SCSI3 reservation protocol exchange from said driver from a SCSI3 reservation protocol exchange received from other sources that directly support SCSI3 reservation protocol exchanges.

14. The system of claim 10 wherein said translator is resident within the host system.

15. A system for processing SCSI2 reservation requests comprising:
driver means operable in a host system for generating SCSI2 reservation requests wherein the driver means is adapted to support only SCSI2 reservation exchanges;
ID generator means for generating a unique ID for an associated path of the host system; and
translator means operable in the host system and communicatively coupled to the driver means for intercepting SCSI2 reservation requests and for translating the intercepted requests into SCSI3 persistent reservation requests using the unique ID wherein the translator means is operable transparent to the driver means,
wherein the translator means is adapted to exchange the SCSI3 persistent reservation requests with a storage subsystem adapted to couple the system and adapted to couple to other systems that directly support SCSI3 persistent reservation exchanges.

16. The system of claim 15 wherein the unique ID includes a host identifier portion useful to verify the identity of the host system that generated the unique ID.

17. The system of claim 15 wherein the unique ID includes a translator signature portion useful to verify that the unique ID was generated by said translator means wherein the translator signature portion serves to distinguish the SCSI3 persistent reservation requests generated by the translator means from a request generated by another system that directly supports SCSI3 persistent reservation protocol exchanges.

18. The system of claim 15 wherein the host system includes multiple paths for communicating with a storage subsystem and
wherein the ID generator means further comprises:
means for generating a unique ID for the host system used in translating said SCSI2 reservation requests on all paths of the host system.

19. The system of claim 15 wherein the host system includes a host bus adapter associated with each path and wherein the means for generating a unique ID for each path includes:
means for generating each unique ID using a world-wide name (WWN) associated with each host bus adapter.

* * * * *